(No Model.) 2 Sheets—Sheet 2.
R. F. WALSH.
Water Gage and Faucet.
No. 235,473. Patented Dec. 14, 1880.
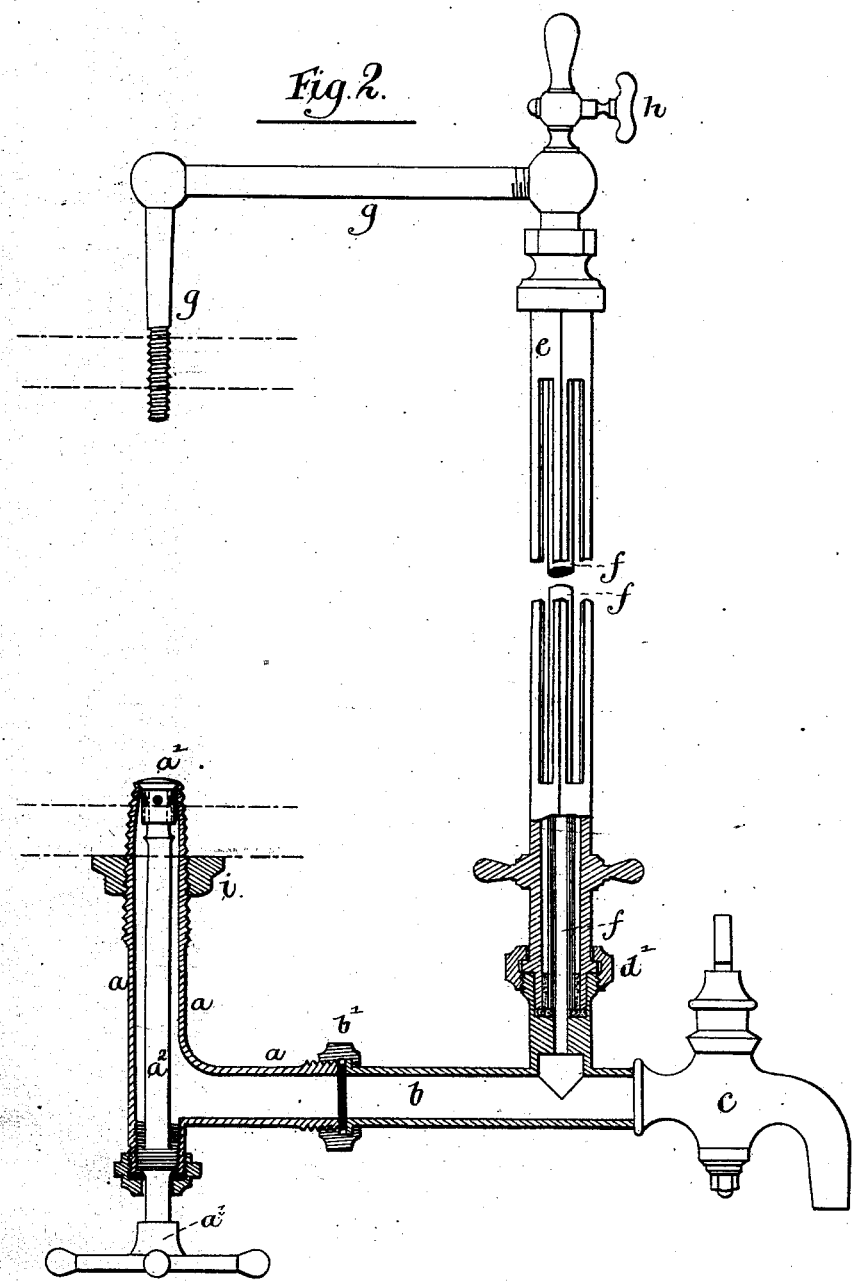
Witnesses:—
Louis M. Hotchkiss.
Fred Haynes
Inventor:—
Robert F. Walsh
by his Attorneys
Brown & Brown

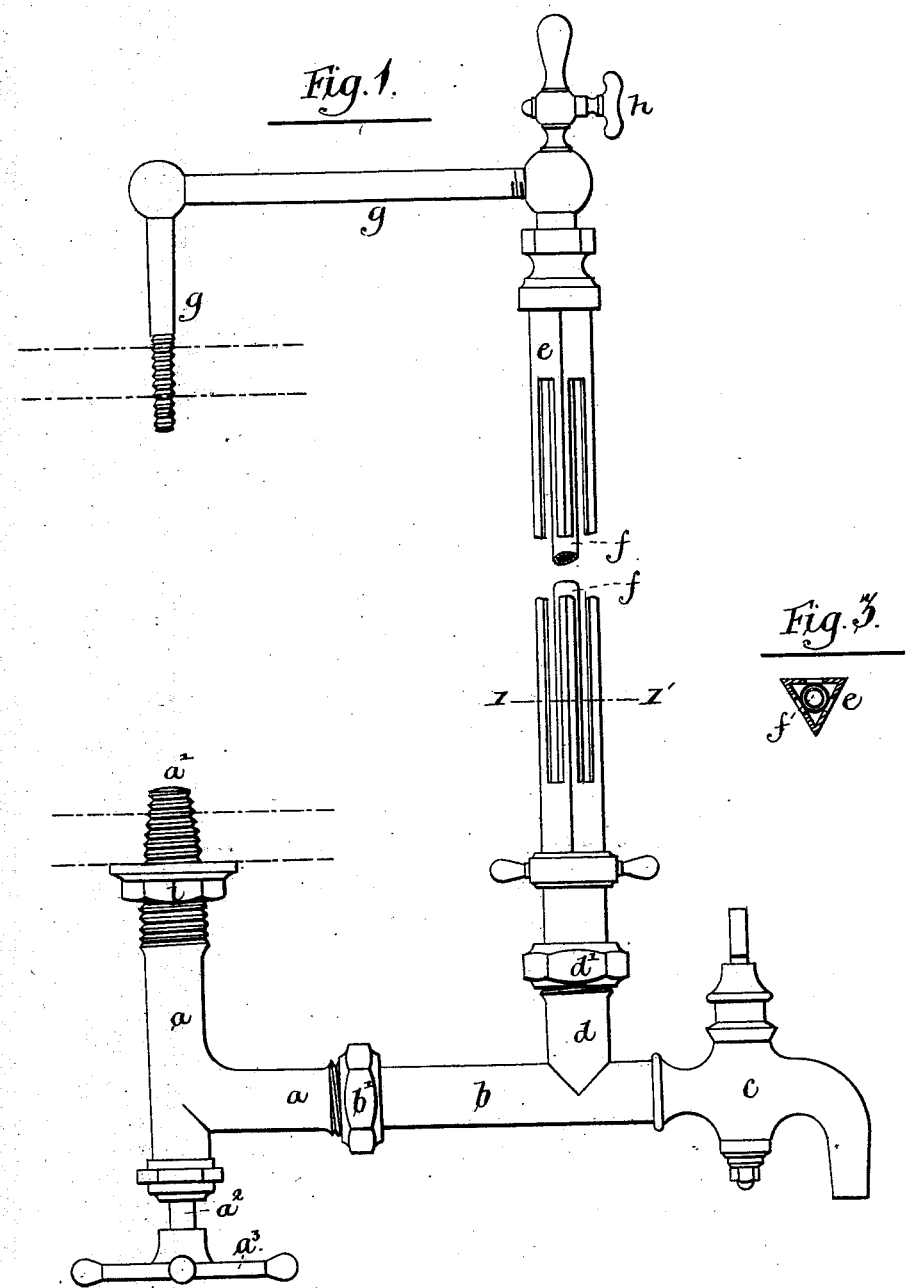

UNITED STATES PATENT OFFICE.

ROBERT F. WALSH, OF KINSALE, IRELAND.

WATER GAGE AND FAUCET.

SPECIFICATION forming part of Letters Patent No. 235,473, dated December 14, 1880.

Application filed July 15, 1880. (No model.) Patented in Great Britain November 19, 1879.

*To all whom it may concern:*

Be it known that I, ROBERT FRANCIS WALSH, a subject of the Queen of Great Britain, residing at Kinsale, in the county of Cork, Ireland, have invented certain new and useful Improved Apparatus for Indicating the quantity of Liquid Withdrawn from Vats, Casks, or Other Receptacles, (for which I have received Letters Patent in England, No. 4,701, dated November 19, 1879,) of which the following is a specification.

This invention relates to improved means and apparatus designed to show the quantity of liquid withdrawn from vats, casks, or other receptacles, and is especially applicable for use in cellars, bars, restaurants, and other places where liquids are sold.

The apparatus will enable users of taps to ascertain at a glance the number of pints, gallons, or other recognized measures drawn from a known quantity during any specified time, and will so act as a check on fraud or dishonesty.

In order to effect this object I make an outlet-tube, of brass or other suitable metal or material, which is inserted into the lower end or bottom of the vat, cask, or other receptacle containing the liquid. To the inner end of this outlet-tube is fitted an inwardly-opening valve worked by a screw-spindle. From this outlet-tube another tube passes in a horizontal direction, where an ordinary cock is fitted. In this horizontal tube an upwardly-extending socket is cast in one with the tube itself.

A glass gage, tube, or cylinder is held in a graduated casing of brass, copper, or any other suitable material. This casing may be screwed into the socket above mentioned, or it may be secured to the socket by means of a screw-coupling.

I graduate a different casing for each different-sized vat, cask, or vessel, as required, or I form the casing triangular, or of other form, in section, and graduate each face as desired, the lower end of said casing being in all cases round, so as to fit in said socket.

The manner in which this apparatus is applied to a cask or vessel containing liquid and acts as an indicator or register of the amount of liquid drawn off (and consequently of liquid left contained in the cask) is very simple. The outlet-tube is driven or screwed into the vessel containing the liquid, the valve is at this time closed, and the horizontal tube is then connected to the outlet-tube by the screw-coupling. The vertical casing containing the glass tube is then connected by another screw-coupling to the socket in the horizontal tube, and on the valve being opened in the outlet-tube the liquid will rise to its own level in the glass tube or cylinder above mentioned. When it is desired to draw off liquid the cock is opened and any quantity allowed to run out. The liquid will fall in the receptacle containing it, and correspondingly in the glass tube, and the quantity drawn off will be indicated by the graduated casing or gage.

The form of the tap and method of mounting the tube may be varied.

The accompanying drawings show different views of my apparatus in the form I find it most advantageous to adopt.

Figure 1 is a side elevation, and Fig. 2 a vertical section, showing my apparatus fitted to a cask, (the top and bottom only of which are indicated by dotted lines,) $a$ being the outlet-tube, to which is fitted the valve $a'$, carried by the spindle $a^2$, and moved to and fro by the small hand-wheel $a^3$. $b$ is the horizontal tube, secured to the outlet-tube by a screw-coupling, $b'$; and $c$ is the cock, fitted to the end of the horizontal tube. $d$ is the socket, cast with the horizontal tube, and into which is secured, either by means of a screw-coupling, $d$, or otherwise, as above described, the graduated casing $e$, containing the glass tube or cylinder $f$. The screw-coupling $b'$ provides for removing the tube $b$, with the gage-tube $f$ and casing $e$ attached thereto, without in any way disturbing the connection of the tube $a$ with the barrel, cask, or vat. The valve $a'$, being at the inner end of the tube $a$ and opening inwardly, provides for entirely emptying the tubes $a$ and $b$ of liquid after the valve $a'$ is closed and before the screw-coupling $b'$ is disconnected.

In order to regulate the atmospheric pressure, and to prevent a vacuum forming within the receptacle containing the liquid, a brass or other metal tube, $g$, is screwed into the top of the cask and connected with the casing containing the glass tube, where I insert a small cock, $h$, to act as an inlet for air, as may be required.

In the vertical section of my apparatus is shown the means by which a perfect adjustment of the gage is obtained. For this purpose to the end of the outlet-tube is applied a lock-nut, $i$, and when the outlet-tube is adjusted by hand sufficiently accurately, it is locked in position by screwing up the lock-nut against the cask, thereby holding the outlet-tube firmly and securely in position.

Fig. 3 is a transverse section at 1 1, Fig. 1, of the glass tube and casing which I find it most convenient to adopt.

I am aware that glass gage-tubes have been applied to boilers and other liquid-receptacles by connecting them with such receptacle at each end; and I am also aware that it is old to apply a valve between each end of said gage-tube and the receptacle. I do not, therefore, claim this as of my invention.

What I claim as my invention, and desire to secure by Letters Patent, is—

1. The combination of the tube $a$, adapted to be secured in the lower part of a cask or vat, and provided at its inner end with an inwardly-opening valve, $a'$, the horizontal tube $b$, provided with a cock or valve, $c$, and with an upwardly-extending socket, a glass gage-tube and a casing therefor inserted and secured in said socket, and a tube for connecting the upper part of said cask or vat with the upper end of said gage-tube, substantially as and for the purpose specified.

2. The combination of the tube $a$, adapted to be secured in the lower part of a cask or vat, and provided at its inner end with an inwardly-opening valve, $a'$, the horizontal tube $b$, provided with a cock or valve, $c$, and an upwardly-extending socket, a glass gage-tube and a casing therefor inserted and secured in said socket, and a coupling, $b'$, in the tube $b$, between said gage-tube and the tube $a$, providing for the removal of the tube $b$, with its gage-tube, without disturbing the tube $a$, substantially as specified.

3. The combination, with the tube $b$, having an upwardly-extending socket, of the glass gage-tube $f$ and the triangular open casing, round at its lower end, both inserted into said socket and secured by a screw-coupling, $d'$, substantially as specified.

ROBERT FRANCIS WALSH.

Witnesses:
JAMES CAULFIELD BEAMISH,
*Late Capt., Ditchley, Little Island, county of Cork, Justice of the Peace for the county of Cork.*
MICHAEL HOLLAND,
*32 Duncan Street, Cork, Law Clerk.*